United States Patent [19]

Schierbeek et al.

[11] Patent Number: 4,916,374
[45] Date of Patent: Apr. 10, 1990

[54] CONTINUOUSLY ADAPTIVE MOISTURE SENSOR SYSTEM FOR WIPER CONTROL

[75] Inventors: Kenneth L. Schierbeek, Zeeland; Mark L. Larson, Grand Haven; Kenneth Schofield, Holland, all of Mich.

[73] Assignee: Donnelly Corporation, Holland, Mich.

[21] Appl. No.: 317,288

[22] Filed: Feb. 28, 1989

[51] Int. Cl.$^4$ ................................................. B60S 1/08
[52] U.S. Cl. ..................................... 318/483; 318/444; 318/DIG. 2
[58] Field of Search ............... 318/443, 444, 480, 483, 318/DIG. 2

[56] References Cited

U.S. PATENT DOCUMENTS

| | | | |
|---|---|---|---|
| 2,108,202 | 2/1938 | Kelly, Jr. | 250/27 |
| 3,197,699 | 7/1965 | Johansen | 324/65 |
| 3,555,289 | 1/1971 | Sobkow | 307/10 |
| 3,643,145 | 2/1972 | Tann et al. | 318/443 |
| 3,649,898 | 3/1972 | Inoue | 318/483 |
| 3,743,056 | 7/1973 | Zitelli et al. | 187/29 |
| 3,786,330 | 1/1974 | Inoue et al. | 318/483 |
| 3,826,979 | 7/1974 | Steinmann | 324/61 |
| 3,882,381 | 5/1975 | Gregory | 324/61 |
| 4,010,383 | 3/1977 | Grassmann | 307/118 |
| 4,131,834 | 12/1978 | Blaszkowski | 318/483 |
| 4,160,175 | 7/1979 | Trout | 307/358 |
| 4,317,073 | 2/1982 | Blaszkowski | 318/483 |
| 4,339,698 | 7/1982 | Kearns | 318/444 |

(List continued on next page.)

FOREIGN PATENT DOCUMENTS

| | | |
|---|---|---|
| 0175362 | 3/1986 | European Pat. Off. . |
| 2101319 | 7/1972 | Fed. Rep. of Germany . |
| 2255264 | 5/1974 | Fed. Rep. of Germany . |
| 2345546 | 3/1975 | Fed. Rep. of Germany . |

(List continued on next page.)

OTHER PUBLICATIONS 5 pp. from Peter Hochstein's workbook dated prior to the conceptions of the present applicants, including circuit diagrams etc.—dates blanked out for confidentiality.

3 pp. from Sieman Opto Electronic Data Book—1986 showing various types of circuits.

Drawings from copending Appl. S/N 183,693 for a Windshield Moisture Sensing Control Circuit, filed 4/19/88, U.S. Application by Hochstein entitled Rain Sensor With Reference Channel.

Peter Hochstein sketch & circuit entitled "Bench Test w/Solar Word Cells for Compensated Rain Sensor", dated prior to Applicant's conception.

*Primary Examiner*—Bentsu Ro
*Attorney, Agent, or Firm*—Price, Heneveld, Cooper, DeWitt & Litton

[57] ABSTRACT

An adaptive moisture sensor system includes a moisture sensor unit having a moisture sensor, which produces a moisture signal, a reference signal generating circuit and a comparator circuit for comparing the moisture signal with the reference signal and for producing an indication to the vehicle's wiper control of the relationship between the signals. The reference signal generating circuit includes a fast positive signal processing circuit for rapidly processing changes in the moisture signal representing decreasing moisture and a slow signal processing circuit to process changes of the moisture signal in both directions at a slow rate. The fast positive signal processing circuit is only enabled during rain conditions due to a contaminant film on the sensed window. The reference signal generating circuit further includes a fast negative signal processing circuit which responds to a stable moisture signal occuring during rain conditions by rapidly offsetting the reference signal to discontinue wiper operation. Multiple sensing assemblies, each including a sensor, a reference signal generating circuit and a comparator, are combined with a master control unit, which responds to any sensing assembly indicating a rain condition, in order to switch all sensing assemblies to a rain mode.

30 Claims, 5 Drawing Sheets

U.S. PATENT DOCUMENTS

| | | | |
|---|---|---|---|
| 4,355,271 | 10/1982 | Noack | 318/480 |
| 4,463,294 | 7/1984 | Gibson | 318/313 |
| 4,476,419 | 10/1984 | Fukatsu et al. | 318/444 |
| 4,481,450 | 11/1984 | Watanabe et al. | 318/444 |
| 4,495,452 | 1/1985 | Boegh-Peterson | 318/444 |
| 4,499,410 | 2/1985 | Iacoponi et al. | 318/444 |
| 4,527,105 | 7/1985 | Shiraishi | 318/444 |
| 4,542,325 | 9/1985 | Kobayashi et al. | 318/483 |
| 4,554,493 | 11/1985 | Armstrong | 318/444 |
| 4,567,412 | 1/1986 | Graham | 318/483 |
| 4,595,866 | 6/1986 | Fukatsu et al. | 318/444 |
| 4,613,802 | 9/1986 | Kraus et al. | 318/483 |
| 4,620,141 | 10/1986 | McCumber et al. | 318/483 |
| 4,636,643 | 1/1987 | Nakamura et al. | 250/338 |
| 4,636,698 | 1/1987 | Leclercq | 318/443 |
| 4,689,536 | 8/1987 | Iyoda | 318/483 |
| 4,703,237 | 10/1987 | Hochstein | 318/483 |
| 4,705,998 | 11/1987 | Millerd et al. | 318/444 |
| 4,710,878 | 12/1987 | Iyoda | 364/424 |
| 4,740,735 | 4/1988 | Hayashi | 318/483 |
| 4,798,956 | 1/1989 | Hochstein | 250/341 |

FOREIGN PATENT DOCUMENTS

| | | |
|---|---|---|
| 2361579 | 6/1975 | Fed. Rep. of Germany . |
| 3001546 | 9/1981 | Fed. Rep. of Germany . |
| 3244767 | 6/1984 | Fed. Rep. of Germany . |
| 54-110529 | 8/1979 | Japan . |
| 58-199253 | 11/1983 | Japan . |
| 59-14563 | 1/1984 | Japan . |
| 59-100034 | 6/1984 | Japan . |
| 59-106348 | 6/1984 | Japan . |
| 60-78844 | 5/1985 | Japan . |
| 60-174348 | 9/1985 | Japan . |
| 61-57842 | 3/1986 | Japan . |
| 1101441 | 1/1968 | United Kingdom . |
| 1150384 | 4/1969 | United Kingdom . |
| 1321221 | 6/1973 | United Kingdom . |
| 1382261 | 1/1975 | United Kingdom . |

CONTINUOUSLY ADAPTIVE MOISTURE SENSOR SYSTEM FOR WIPER CONTROL

BACKGROUND OF THE INVENTION

This invention relates to moisture sensors for automotive vehicle windows such as windshields, and more particularly to control systems incorporating such sensors to operate vehicle accessories such as windshield wipers.

In one type of windshield moisture sensor, a light beam is directed into the windshield at an angle and the refracted/reflected portion of the beam is monitored by a photodetector which produces a moisture signal. When moisture is present on the window, a decreased amount of light is refracted/reflected to the photodetector, which reduces the amplitude of the moisture signal. The moisture signal is monitored by circuit means to evaluate whether moisture is present.

Such a moisture sensor typically further includes means for producing a reference level against which the moisture signal is compared. When the magnitude of the moisture signal drops below the value of the reference signal, the system actuates the windshield wipers. When a fixed reference level is provided, the degradation of the system components with age and the variations in their performances due to temperature and other environmental factors, results in a system where false wipes are frequent or no wipes may occur even when moisture is on the window.

In order to overcome the difficulties of the fixed reference signal systems, it has been proposed to provide a variable reference signal that will be modified in response to the same conditions that are causing changes in the moisture sensing system. The reference signal in such a system may be adjusted by a second detector, which does not receive light that has been affected by the moisture condition of the windshield but would otherwise be affected by the environmental conditions experienced by the primary detector. Such systems can require a considerable amount of calibration in order to produce similar signal characteristics. The two detectors furthermore do not necessarily respond to all environmental conditions in the same manner.

Another attempt to overcome the difficulties of the fixed reference signal system has been to provide a variable reference generating circuit which responds directly to the moisture signal when the windshield is in a dry condition, as occurs immediately after the wiper has passed the sensor, to establish a reference signal which adapts to changes in the condition of the system, the windshield and the wipers. While such adaptive reference value systems avoid some of the difficulties of the other systems, certain environmental influences, such as street lights, oncoming headlights, taillights, commercial signs and other filament-type light bulbs may adversely influence the reference level, which tends to adapt to these environmental influences in a manner that may cause the reference signal to increase above the moisture signal even when the windshield is dry, thus producing false wipes. Such known adaptive reference value systems typically employ a peak sample and hold circuit to store a reference value at the moment the windshield wiper passes over the sensor area, which is presumed to be the driest condition of the windshield. Such systems are susceptible to recording an erroneous reference signal as a result of reflections and other interference caused by passage of the wiper blade over the sensor area.

Another problem encountered by prior windshield moisture sensor systems in general, and adaptive reference value systems specifically, is that the sensor may erroneously interpret a dry contaminant film, such as dirt or salt, that may be deposited on the windshield during a rain condition, as moisture, and continue to operate the wipers even after the windshield is dry and even though the wipers are clearly not having an effect on the film.

SUMMARY OF THE INVENTION

The present invention is directed to providing an adaptive moisture sensor system for a vehicle wiper control that is intended to overcome the difficulties of the prior art windshield moisture sensor systems. The present invention provides a vehicle wiper control that adapts to the driest detected condition of the vehicle windshield by providing moisture sensing means responsive to the presence of moisture for producing a moisture signal, reference signal generating means for generating a reference signal and comparison means for producing an output to the vehicle wiper means indicative of the relationship between the moisture signal and the reference signal. The reference generating means is responsive to the moisture signal and includes signal processing means for substantially continuously adapting the reference signal to the moisture signal at a faster rate during periods of decreasing sensed moisture than during periods of increasing sensed moisture. Such a control may further include inhibiting means responsive to the system output for inhibiting the signal processing means from adapting the reference signal to the moisture signal at the faster rate during periods of substantially no sensed moisture. Thus, during periods when the moisture signal does not rapidly change in response to the accumulation of moisture on the windshield and frequent wiping of the moisture therefrom, the signal processing means responds slowly to avoid adapting the reference signal to rapidly changing environmental conditions.

A vehicle wiper control according to another aspect of the invention, includes moisture sensing means responsive to the presence of moisture for producing a moisture signal, reference signal generating means for generating a reference signal and comparison means responsive to the moisture signal and the reference signal for producing an output to the vehicle wiper system indicative of the relationship between the moisture signal and the reference signal. The reference signal generating means is responsive to the moisture signal for continuously adapting the reference signal toward a predetermined relationship with the moisture signal and includes means for determining that the moisture signal is stable and for offsetting the reference signal in response to a stable moisture signal. By determining that the moisture signal is stable, the reference generating means detects the presence of a dry contaminant film, which otherwise appears to the moisture sensing means as moisture on the windshield. The offsetting of the reference signal in response to a stable moisture signal is intended to restore the predetermined relationship between the moisture signal and the reference signal indicative of a dry condition, thereby causing the vehicle wiper control to terminate wiping.

A vehicle wiper control according to another aspect of the invention includes a plurality of moisture sensing units, each of which includes moisture sensing means responsive to the presence of moisture on the vehicle window for producing a moisture signal indicative of the amount of moisture present at the sensing unit, reference generating means responsive to the moisture signal for generating a reference signal and comparison means responsive to the moisture signal and the reference signal for producing an output signal indicative of the relationship between the moisture signal and the reference signal. Such a system further includes a master control interconnected with the plurality of moisture sensing units and including means for modifying the manner in which the reference generating means on the plurality of moisture sensing units respond to their respective moisture signals. The modifying means is actuated in response to any one of the moisture sensing controls producing an indication of a rain condition.

These and other related objects, advantages and features of this invention will become apparent upon review of the following specification in conjunction with the drawings.

DETAILED DESCRIPTION OF THE PREFERRED EMBODIMENT

Figures 1, 2:
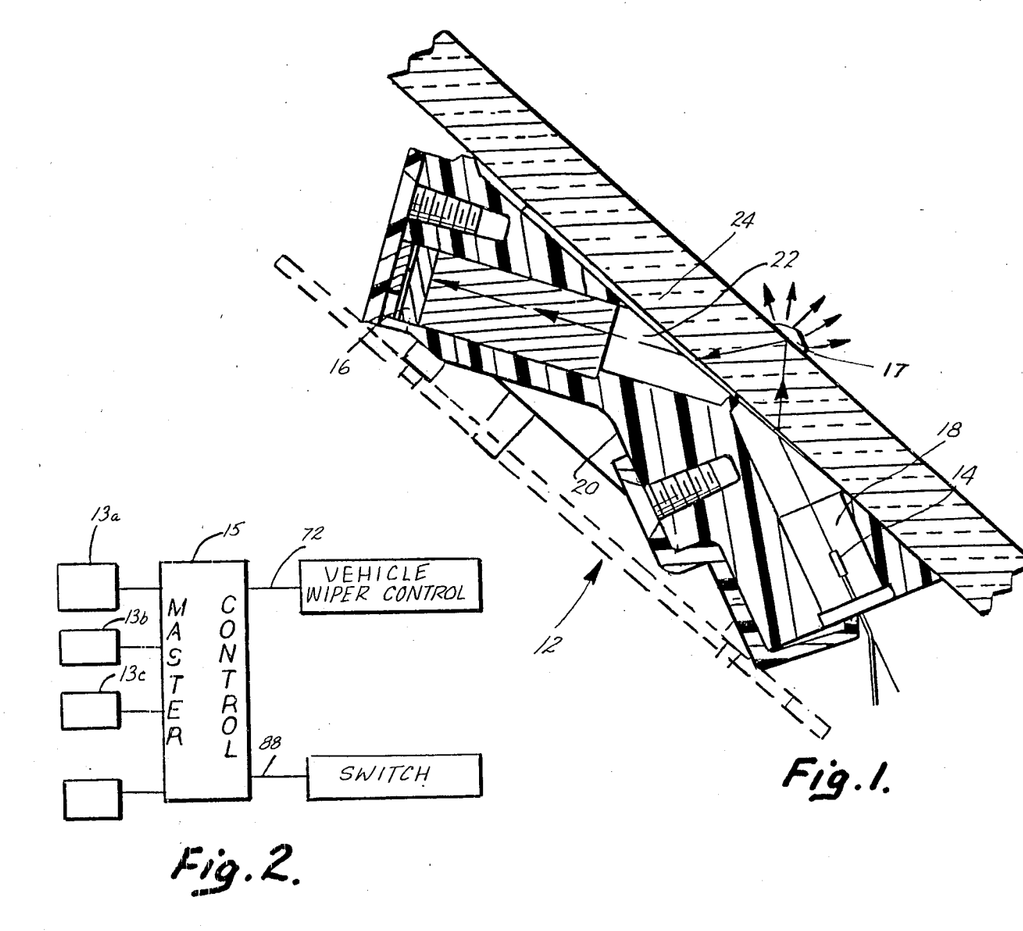
FIG. 1 is a sectional view of an emitter/sensor unit with which the present invention is operative.
FIG. 2 is a diagram illustrating modules combined to form a moisture sensor system according to the invention.

Referring now specifically to the drawings, and the illustrative embodiments depicted therein, a windshield wiper control system, generally illustrated at 10 (FIG. 3), includes a moisture sensor, generally shown at 12, having an (infrared) IR emitter means 14 and a photovoltaic cell 16. The physical arrangement of moisture sensor 12 is illustrated in FIG. 1 as including a housing 20 attached to the inner surface of a windshield 24 and having angularly disposed passages 18 and 22, both of which open to windshield 24. This physical configuration is more fully described in copending application, Ser. No. 183,706, filed Apr. 19, 1988, by Desmond O'Farrell et al and entitled VEHICULAR MOISTURE SENSOR AND MOUNTING APPARATUS THEREFOR and assigned to the assignee of the present application, the disclosure of which is hereby incorporated herein by reference. Since the physical configuration of the rain sensor is fully described in said application, such description will not be included in detail herein. Suffice it to say that emitter 14 is positioned in passageway 18 and emits radiation in the near infrared region against windshield 24. The IR radiation is refracted and reflected by surfaces of the windshield into passageway 22 in which photovoltaic cell 16 is positioned. Droplets of moisture M deposited on the windshield, cause more of the IR radiation from emitter means 14 to be transmitted away from the glass and less to be reflected to photovoltaic cell 16. Therefore, photovoltaic cell 16, which produces a moisture signal on an output 26, responds to the presence of moisture on windshield 24 by incrementally decreasing the amplitude of the moisture signal on output 26.

Figure 3:
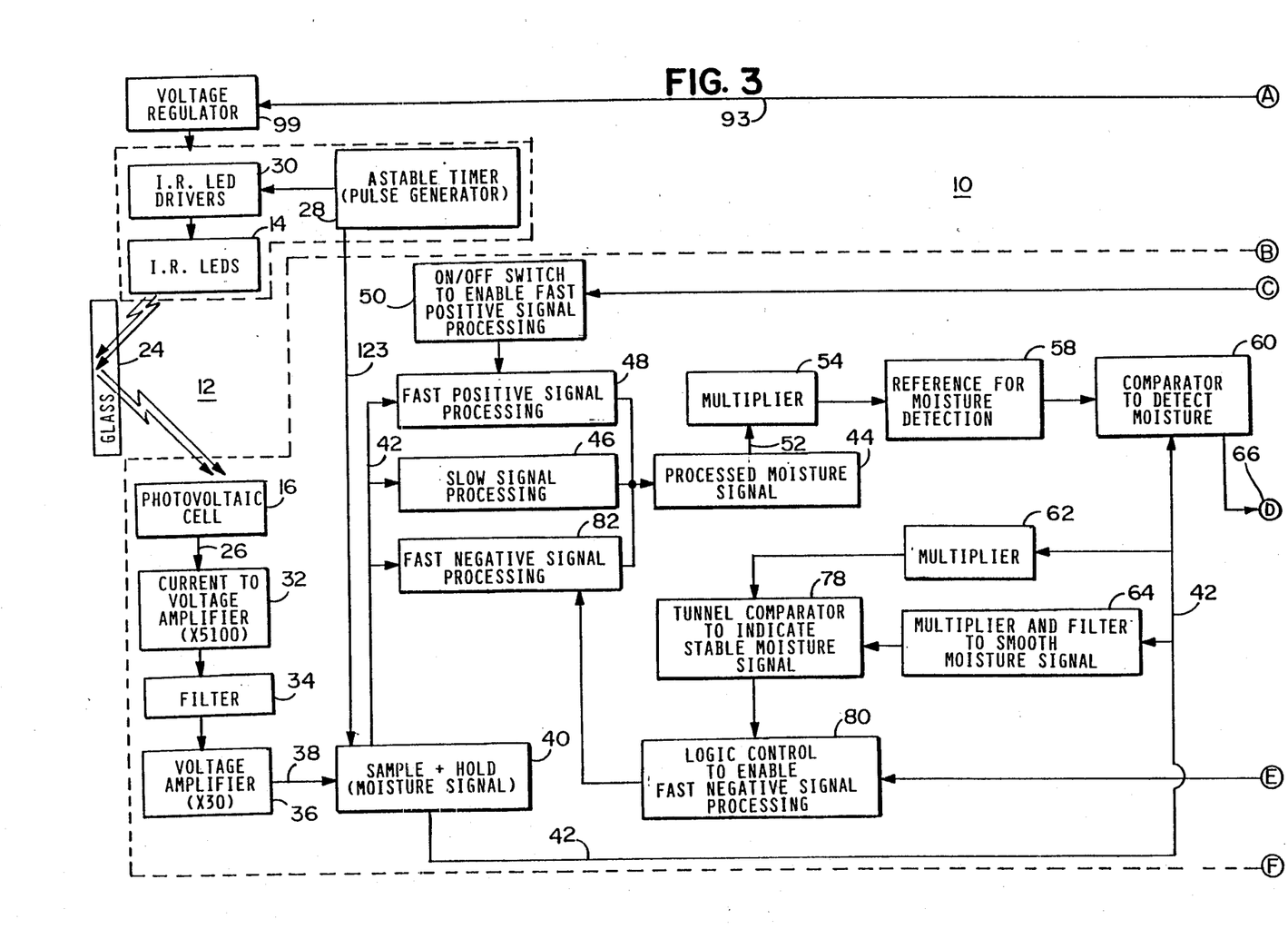
FIGS. 3 and 3A illustrate the electrical circuit of a moisture sensor system according to the invention, illustrated in block diagram form.
Figure 3A:
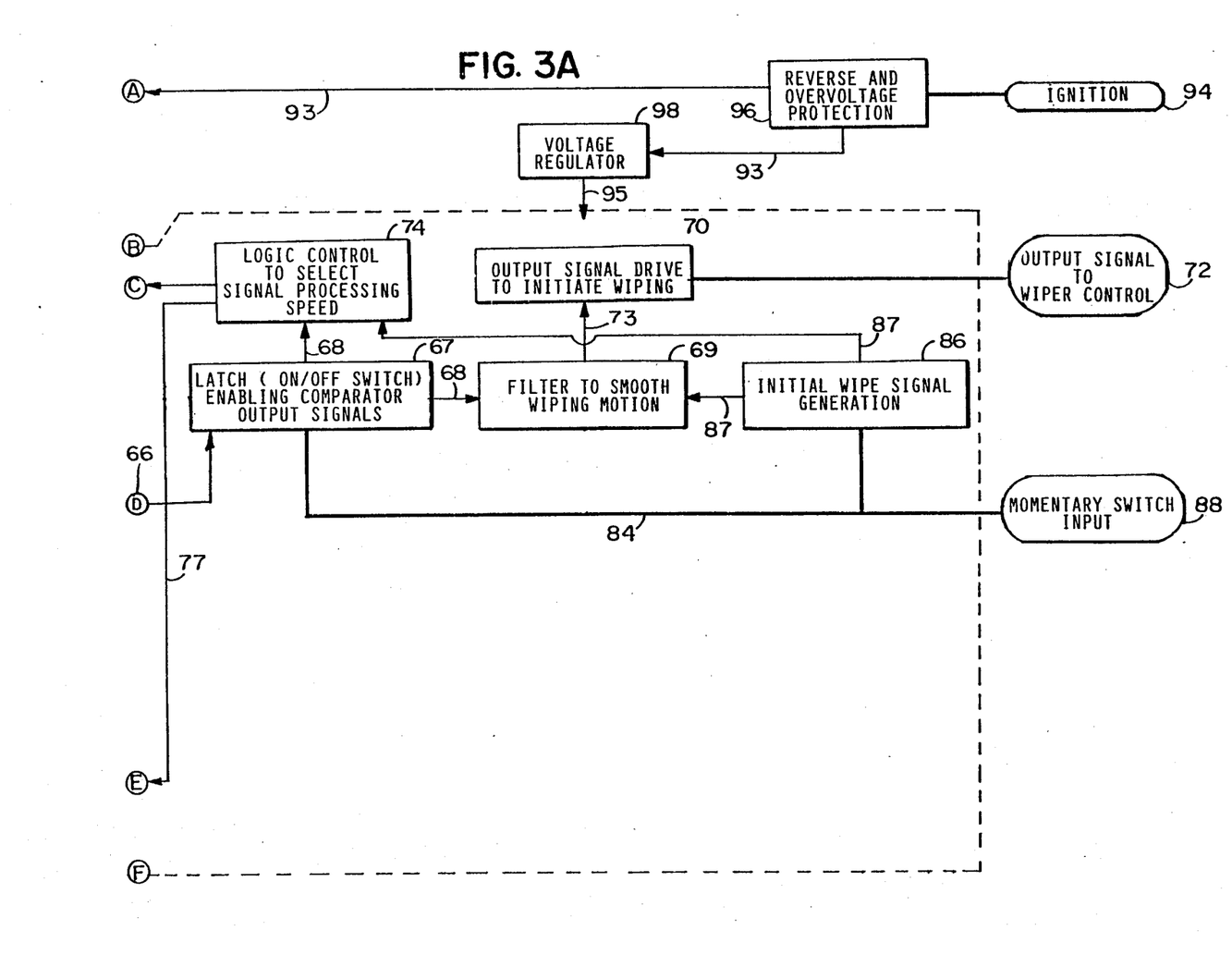

Infrared emitter means 14 includes a plurality of light-emitting diodes which are intermittently illuminated in unison by an astable timer 28, which triggers an LED driver circuit 30 which, in turn, causes a current to flow through the LEDs in emitter means 14. In the illustrated embodiment, astable timer 28 operates at approximately 200 Hz. The signal on the output 26, of photovoltaic cell 16, is converted from a current to a voltage and amplified by an amplifier 32. Any DC offset on the signal as it is outputted by amplifier 32 is removed by a high-pass filter 34. With the DC component removed, the AC component is further amplified by amplifier 36, which provides its output 38 to a sample and hold circuit 40.

A sample and hold circuit 40 receives the output from amplifier 36 and a gating signal on line 123 from astable timer 28. Upon the receipt of a gating pulse from timer 28, sample and hold circuit 40 retains and provides, at an output 42, the value of the signal from amplifier 36 until the next gating pulse is received, which causes the next value of the signal from amplifier 36 to be retained at output 42. In this manner, the moisture signal provided at output 42 of sample and hold circuit 40 is a DC signal having an amplitude, which changes in a stepped fashion in unison with astable timer 28. Moisture signal output 42 of the sample and hold circuit is provided to a processed moisture signal element 44 through a first path including a slow signal processing circuit 46, through a second path including a fast positive signal processing circuit 48 and through a third path, including a fast negative signal processing circuit 82. Fast positive signal processing circuit 48 is selectively enabled by an on/off switch 50 and fast negative signal processing circuit 82 is selectively enabled by a logic control circuit 80. When enabling switch 50 disables the path through fast positive signal processing circuit 48 and logic control circuit 80 disables the path through fast negative signal processing circuit 82, the moisture signal on output 42 is processed with processed moisture signal element 44 through only the slow signal processing circuit 46. When switch 50 enables fast positive signal processing circuit 48, positive incremental changes in the moisture signal are processed with processed moisture signal element 44 through signal processing circuit 48 and both positive and negative changes are processed through the slow signal processing circuit 46. Likewise, when logic control circuit 80 enables fast negative signal processing circuit 82, negative incremental changes in the moisture signal are processed with the processed moisture signal element 44 through signal processing circuit 82 and both positive and negative changes are processed through the slow signal processing circuit 46.

Processed moisture element 44 produces a processed moisture signal on an output 52 which is provided to a multiplier 54, which scales the processed moisture signal to provide a reference 58 to a moisture detecting comparator 60. Comparator 60 also receives the moisture signal output 42 from sample and hold circuit 40 and compares the value of the moisture signal with the reference level from reference circuit 58. An output of comparator 60 is provided on line 66, which is an input to a latch enabling circuit 67. When comparator 60 causes line 66 to switch to a positive state, the latch enabling circuit responds by changing the state of an output 68, provided circuit 67 is latched "on." Output 68 is connected through a filter circuit 69, having an output 73, to a driving circuit 70. Driving circuit 70 is configured to provide an output signal at 72 for indicating to a vehicle wiper control the necessity for operating the vehicle's wipers to remove moisture from windshield 24. Filter circuit 69 imparts a slight delay between output 69 of circuit 67 changing states and driving circuit 70 receiving an input on line 73, in order to prevent transient environmental effects that momentarily cause the rain signal on line 42 to drop below reference 58, from causing a false wipe, or that momentarily cause the rain signal to increase above reference 58, from causing a false pause in wiper operation.

Output 68 of latch enabling circuit 67 is additionally provided as an input to a logic control circuit 74. Logic control circuit 74 produces output signals on lines 76 and 77 in response to a change of state on line 68 indicative of a moisture or rain condition. Line 76 is provided to switch 50 to operate switch 50 to enable the fast positive signal processing circuit 48. Output line 77 is provided as an input to logic control circuit 80. Logic control circuit 80 additionally receives an input from a tunnel comparator 78. Moisture signal on line 42 is filtered and scaled by a circuit 64 and presented as a first input to tunnel comparator circuit 78. Moisture signal 42 is additionally scaled, but not filtered, by multiplier 62 and applied as a second input to tunnel comparator circuit 78. If the unfiltered moisture signal from multiplier 62 does not exceed either a positive or a negative threshold with respect to the filtered and scaled moisture signal from circuit 64 within a predetermined period of time, such as 3 seconds, tunnel comparator circuit 78 produces a change of state on its output, which causes logic control circuit 80 to enable fast negative signal processing circuit 82, provided line 77 is additionally in a state indicative of a rain, or moisture condition.

Latch enabling circuit 67 receives an input on a line 84 from a momentary actuatable user switch 88. When line 84 changes state in response to a momentary actuation of switch 88, indicating that the user has selected the moisture-sensing wiper control function, circuit 67 latches to an "on" state. When circuit 67 is latched "on", a change of state on input 66 will be propagated to outputs 68. Line 84 is additionally provided as an input to an initial wipe signal generator 86. Generator 86 responds to a change of state on line 84 by providing a change of state on a line 87 extending to logic control 74 and, through filter circuit 69, to driving circuit 70. Logic control 74 will respond to the line 87 change by momentarily enabling the fast positive signal processing circuit 48 via switch 50 for a brief period. The purpose of this brief enabling of circuit 48 is to cause the output 52 of the processed moisture signal element 44 to rapidly adapt to the moisture signal on output line 42, through the fast signal processing path, upon selection of the moisture sensing mode by the driver. Output signal drive circuit 70 will respond, after a brief delay, to the line 87 change by producing an output signal to the vehicle wiper control sufficient to cause one sweep of the wiper across the windshield. The purpose of this individual wipe is to initially restore the windshield to a dry condition, if it had become moisture-bearing, to properly establish the level of output 52 of processed moisture signal element 44.

Power to the windshield wiper control system 10 is provided from the vehicle ignition circuit 94, which is powered from the vehicle's DC power system whenever the vehicle ignition is energized. The ignition voltage is conditioned at 96 to protect against reverse connection of the battery leads and to filter out excessive voltage swings. From protection circuit 96, voltage is regulated by regulators 98 and 99, and provided as operating voltage to the various portions of the wiper control system. When power is initially applied to system 10, logic control 74 responds by momentarily enabling the fast positive signal processing circuit 48 for a brief period.

In operation, when user switch input 88 is momentarily operated by the vehicle operator, its output on line 84 momentarily changes state. Latch enabling circuit 67 responds to the change of state on line 84 by latching to an "on" condition, ready to respond to changes in the state on line 66. Initial wipe signal generating circuit 86 responds to the change of state on line 84 by producing a signal of momentary duration on its output 87, of sufficient duration to cause the vehicle's wiper control system to produce one wipe of the windshield, through drive signal circuit 70, and a brief enablement of the fast positive signal processing circuit 48, through logic control 74.

Processed moisture element 44 integrates the differential between the moisture signal on 42 and the processed moisture signal on 52 in a continuous manner at a rate that is determined by whether the differential is integrated by processed moisture signal element 44 with only the slow signal processing circuit 46 or with the slow signal processing circuit in combination with one or the other or both of the fast signal processing circuits 48 and 82. When fast positive signal processing circuit 48 is disabled by switch 50 and fast negative signal processing circuit 82 is disabled by control circuit 80, processed moisture signal element 44 integrates the differential between the moisture signal on line 42 and the processed moisture signal on line 52 with slow signal processing circuit 46, having a time constant on the order of one minute. This slow signal processing will resist rapid environmental changes, such as the flickering of oncoming headlights or the passage under an overhead light, from substantially altering output 52 of processed moisture signal element 44 because these occur too rapidly to be processed by slow signal processing circuit 46.

When moisture begins to accumulate on windshield 24, the incremental decrease in the moisture signal on line 42 will cause it to become more negative than reference 58 which will cause output 66 to change states. If latched "on", latch enabling circuit 67 will respond to this change by producing a change of state on lines 68. Drive circuit 70 will respond to the resulting change of state on line 73 by producing a WIPE signal on output 72. Logic control 74 will respond to the change of state on line 68, after a brief delay, by causing switch 50 to enable fast positive processing circuit 48. The purpose of the brief delay is to provide another layer of protection against false wipes caused by rapidly changing environmental conditions. The enabling of fast signal processing circuit 48 will result in processed moisture signal element 44 integrating positive differentials between the moisture signal on line 42 and the processed moisture signal on line 52 at a fast rate with fast signal processing circuit 48. Processed moisture element 44 will continue to integrate negative differentials between the moisture signals and the processed moisture signal at a slow rate with slow signal processing circuit 46.

Thus, with fast positive signal processing circuit 48 enabled, as operation of the wiper momentarily clears the windshield 24, the positive differentials between the moisture signal and the processed moisture signal are integrated with fast positive signal processing circuit 48, which has a time constant on the order of one quarter of a second. However, negative differentials between the moisture signal and the processed moisture signal, caused by the subsequent accumulation of moisture on the windshield, are not integrated with fast signal processing circuit 48.

During a moisture or rain condition, the repetitive accumulation of moisture on the windshield and periodic removal thereof by the wiper, causes a cyclical variation in the moisture signal on line 42. Because the processed moisture signal element 44 integrates positive differentials between the moisture signal and the processed moisture signal at a rate faster than negative differentials, the reference 58 will be at a higher, or more positive, level than moisture signal 42, which will cause comparator 60 to produce an output on line 66 indicating the presence of moisture. As the rain condition terminates, the moisture signal on line 42 should become more positive than reference 58, which will cause output 66 of comparator 60 to change to a deenergized state. However, if, during a rain condition, the windshield is contaminated with road salt, mud, or the like, the moisture signal on line 42 will remain at a decreased level even after rain has terminated and the windshield has become dry because of the presence of a contaminant film. Thus, although the necessity for continued operation of the vehicle's wipers has been removed, the comparator 60 will continue to produce an output on line 66 indicative of the need for operation of the wipers. Although the level of the reference signal will eventually decrease, as the negative differential between the moisture signal and the processed moisture signal is integrated with slow signal processing circuit 46, the result would be an annoying operation of the wipers for an extended period of time when none is desired.

Such dry film of contaminant on the windshield produces a relatively steady moisture signal 42 without the large swings experienced during a true rain condition. Because the unfiltered input to tunnel comparator circuit 78 through multiplier 62 stays within the threshold tolerance of the filtered moisture signal from circuit 64 for the predetermined period of time when the moisture signal is responding to a dry film, tunnel comparator circuit 78 will produce an output to logic control circuit 80 which will enable fast negative signal processing circuit 82, provided that line 77 is in a state indicative of a rain condition, which it would if the moisture sensor mistakes a contaminant film for moisture. The processed moisture signal element 44 will integrate the negative differential between the moisture signal and the processed moisture signal at a fast rate with fast negative signal processing circuit 82, which will cause the reference signal to be rapidly offset to a level that will cause comparator 60 to remove the moisture indication from output 66 so that the output signal drive 70 will indicate to the vehicle's wiper control that wiping is no longer required.

When the need for wiping is no longer indicated, latch enabling circuit 67 responds to the change in state of output 66 by immediately switching line 68 to a deenergized state, which causes drive circuit 70 to remove the indication to the vehicle wiper control of the need to wipe. Logic control circuit 74 responds to the change in state of line 68 by causing switch 50, after a predetermined delay of approximately 7 seconds, to disable fast positive signal processing 48 and causing logic control circuit 80, after a predetermined delay of approximately 0.1 seconds, to disable fast negative signal processing circuit 82. With fast signal processing circuits 48 and 82 disabled, the system again becomes substantially nonresponsive to rapid environmental changes caused by various light sources.

Figure 4:
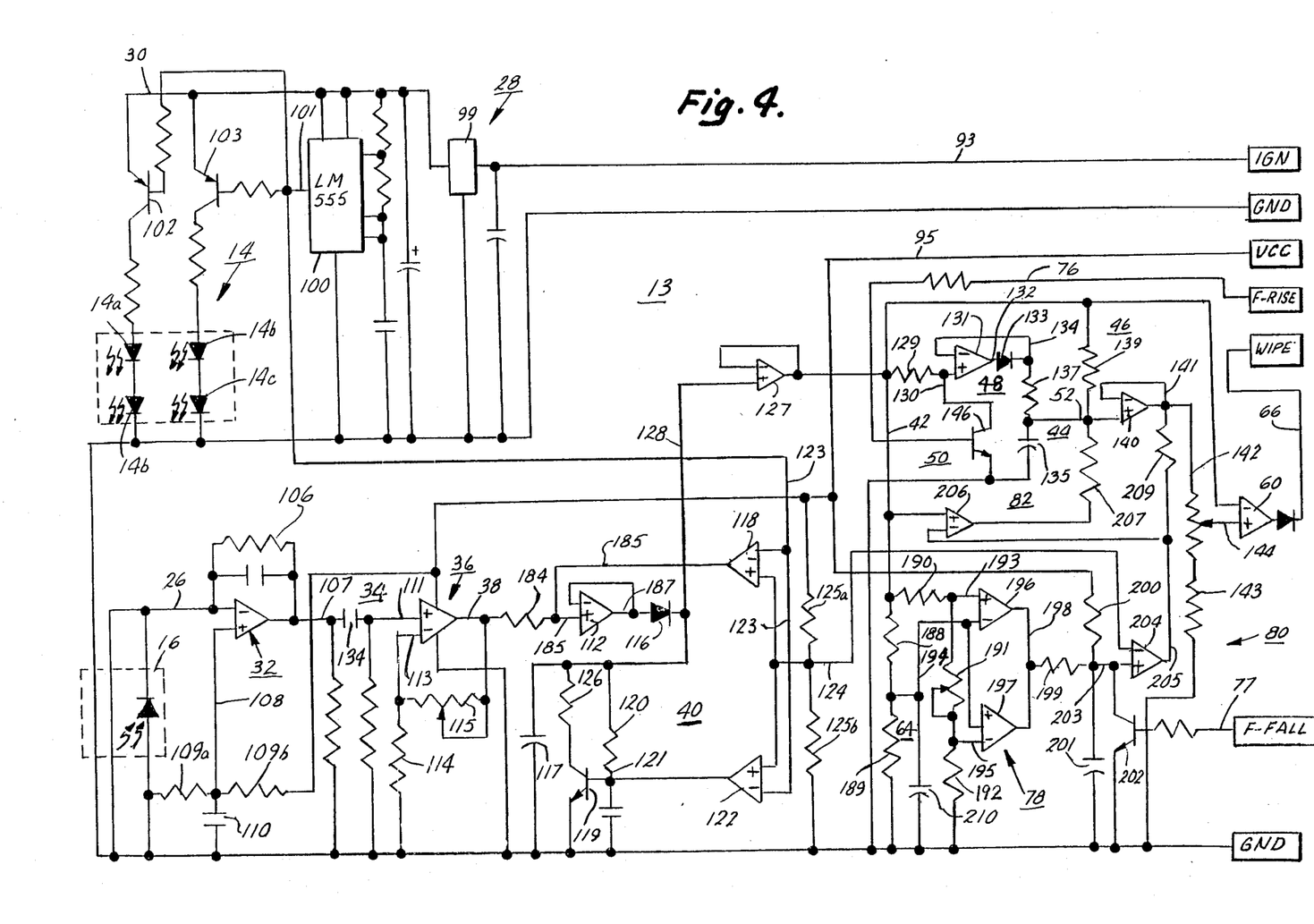
FIG. 4 is the electrical circuit of the sensing unit portion of the invention, illustrated in schematic diagram form.

Referring to FIG. 4, astable timer 28 includes a squarewave generator 100 such as a timing circuit LM555, having output 101 connected to the respective bases of driving transistors 102 and 103, which form LED driver circuit 30. Each transistor 102, 103 is connected in common emitter configuration with a series circuit, each series circuit consisting of two of the diodes 14a, 14b, 14c and 14d. In this configuration, all the diodes are illuminated in unison. The light received by photovoltaic cell 16 from windshield 24 produces a current on line 26 which is provided to the inverting input of an amplifier 32. A feedback resistor 106 between output 107 and inverting input 26, establishes the gain of amplifier 32 at approximately 5100 and causes the amplifier to convert the current produced from cell 16 to a voltage on its output 107. The non-inverting input 108 to amplifier 32 is biased by a pair of resistors 109a and 109b connected respectively to signal ground and to VCC. A capacitor 110 between input 108 and signal ground provides noise immunity.

Output 107 is connected through filtering capacitor 34 to amplifier 36. Capacitor 34 is provided to remove any DC offset of output 107 so that only AC signals are presented to amplifier 36 in order to remove the effects caused by background ambient light. Capacitor 34 is connected with the non-inverting input 111 of an amplifier 112 whose inverting input 113 is connected to signal ground through a resistor 114. A gain calibration feedback resistor 115 is connected between output 38 and inverting input 113 and provides means to establish the gain of amplifier 36, which is nominally adjusted to have a gain of 30. Output 38 is connected through a resistor 184 to the non-inverting input 185 of an amplifier 186. An output 187 of amplifier 186 is connected to its inverting input, to configure the amplifier as a voltage-follower or buffer amplifier, and through a fowardly-poled diode 116 to sample and hold circuit 40. Sample and hold circuit 40 includes a capacitor 117, having a nominal value of 1 uF, connected in parallel with a switching means including a resistor 126 in series with transistor 119 connected in common emitter configuration between a line 128 and signal ground. The base 121 of transistor 119 is connected through a resistor 120 to VCC and to the output of a comparator 122. The output of comparator 122 is configured as an open collector transistor that will cause current to flow through transistor 119 only when the non-inverting input 124 of the comparator exceeds its inverting input 123. Inverting input 123 of comparator 122 is connected with output 101 of squarewave generator 100 and non-inverting input 124 is maintained at a constant voltage by connection with the junction of a series combination of resistors 125a and 125b connected between VCC and signal ground. A companion comparator 118 has its inputs connected the same as those of comparator 122 and its open collector output connected with input 185 of amplifier 186.

The output of photovoltaic cell 16, which is converted to a voltage by amplifier 32, filtered at 34 and amplified by amplifier 36 charges capacitor 117 through buffer amplifier 186 and diode 116 whenever output 38 of amplifier 36 becomes more than the forward voltage drop of diode 116 more positive than the voltage on line 128. Thus, if the amount of moisture on windshield 24 becomes less during the succeeding pulse of light from emitter means 14, output 38 will be incrementally more positive than during the previous pulse of light. This positive increment will be transferred through buffer amplifier 186 and forwardly-biased diode 116 to increase the voltage across capacitor 117.

If, however, the amount of moisture increases on the windshield 24, the next succeeding pulse of light will cause the output on amplifier 38 to incrementally decrease. Because the voltage on output 38 would then be less than the voltage on line 128 across capacitor 117, diode 116 would be reverse-biased. In order to allow the signal on line 128 to decrease to the level at output line 38, less one diode junction drop, comparator 122 responds to the negative swings in the output 101 of squarewave generator 100, which correspond to the illumination of diodes 104, by causing its output transistor to be open and allowing resistor 120 to pull line 121 positive. This pulse causes transistor 119 to conduct, which bleeds a portion of the charge of capacitor 117 to ground through a resistor 126 in series with transistor 119 and signal ground. Thus, the voltage on capacitor 117 is lowered sufficiently to enable diode 116 to be forward-biased such that output line 38 can reestablish the voltage on line 128 at the then existing level on line 38 less one diode junction drop. Thus, it is seen that the voltage on line 42 has a continuous DC level which incrementally increases or decreases in unison with changes in the output 38 from the amplified photoreceptor cell output and is thus representative of the amount of moisture on windshield 24. During illumination of diodes 14, the negative swing of line 123 will also cause the output transistor of comparator 118 to be open. This allows the voltage on line 38 to influence the voltage across capacitor 117 as previously described. When the diodes 14 are not illuminated, the positive swing of line 123 causes the output transistor of comparator 118 to conduct, which clamps line 185 essentially to ground potential. This provides a beneficial filtering action to preclude ambient light changes from influencing capacitor 117 between pulses of moisture-sensing light from diodes 14.

The signal on line 128 is buffered by a unity gain amplifier 127 to provide a moisture signal on line 42. Line 42 is connected through a resistor 129 to the non-inverting input 130 of an amplifier 131. The output 132 of amplifier 131 is connected through a forwardly-poled diode 133 to a line 134 which is connected with the inverting input of amplifier 131. A capacitor 135 is connected between line 134 and signal ground through a resistor 137. With this arrangement, when line 42 is higher or more positive than the voltage on line 52 across capacitor 135, amplifier 131 provides a low impedance source capable of providing sufficient current to charge capacitor 135. In contrast, when line 42 is lower, or more negative than line 52, diode 133 becomes reverse-biased and provides a very high impedance. Output line 134 charges capacitor 135 at a rate determined by the time constant established by the values of resistor 137 and capacitor 135. Amplifier 131, resistor 137 and diode 133 constitute fast signal processing path 48.

Capacitor 135 may additionally be charged directly from the moisture signal on line 42 through a resistor 139. In contrast to fast signal processing path 48, both positive and negative differentials between the voltage on line 42 and that on line 52 are applied to capacitor 135 through resistor 139, which constitutes slow signal processing path 46. Resistor 139 will provide a path for capacitor 135 to be both charged and discharged. In the illustrated embodiment, capacitor 135 is 100 uF and the charging resistors have the following values:

| Resistor 137 | 1.5K Ohms |
|---|---|
| Resistor 139 | 750K Ohms |

Thus, it can be seen that capacitor 135 may be charged at a much faster rate through resistor 137, and at a much slower rate through resistor 139. Slow signal processing path 46 will apply both positive and negative voltage differentials to capacitor 135 while fast signal processing circuit 48 will only apply positive voltage differentials to capacitor 135.

A transistor 146 is connected between input 130 of amplifier 131 and signal ground. The base of transistor 146 is connected to fast positive signal processing enabling line 76. When enabling line 76 is provided with a positive signal, transistor 146 becomes conducting, which clamps input 130 at a low state. Therefore, when enabling line 76 receives a positive signal, the fast signal processing circuit 48 cannot conduct signals from line 42 and is prevented from charging capacitor 135. When such a positive signal is removed from line 76, transistor 146 becomes non-conducting and fast signal processing circuit 48 is enabled to conduct positive signals from line 42 to capacitor 135, in the manner previously described. Transistor 146 constitutes switch 50.

The rain signal on line 42 is additionally connected to a network including a parallel combination of a resistor 189 and capacitor 210 connected in series with a resistor 188 between line 42 and signal ground. This network defines multiplier and filter circuit 64. Resistors 188 and 189 scale the moisture signal on line 42 and integrate the scaled moisture signal with a capacitor 210 at an approximately 0.5 second time constant. The integrated rain signal is presented on a line 194 to the inverting input of a comparator 196 and the non-inverting input of a comparator 197. Moisture signal line 42 is additionally connected to a network consisting of a series combination of resistors 190, 191 and 192 connected in series between line and signal ground. Resistors 190, 191 and 192 define multiplier circuit 62. The junction between resistors 190 and 191 is presented to the non-inverting input 193 of comparator 196. The junction between resistors 191 and 192 is connected with the inverting input 195 of comparator 197. The outputs of comparators 196 and 197 are open collector transistors combined at line 198 in an OR configuration. Line 198 is connected through resistor 199 to a junction 203. Junction 203 is defined between a series combination of a resistor 200 and capacitor 201 connected between VCC and signal ground. Junction 203 is connected to the non-inverting input of a comparator 204 whose inverting input is maintained at a constant voltage level by connection with line 124. The output of comparator 204, which is an open collector transistor, is connected with a line 205, which in turn, is connected to the inverting input of comparator 206 and through resistor 209 to the output 141 of a buffer amplifier 140. Amplifier 140 is connected in voltage-follower configuration from processed moisture signal line 52. A non-inverting input of comparator 206 is connected with the moisture signal on line 42. The output of comparator 206, which is an open collector transistor, is connected through a resistor 207 to processed moisture signal line 52. A transistor 202 is connected between junction 203 and signal ground with its base connected to fast negative signal processing enabling line 77.

Comparators 196 and 197 receive a filtered, or smoothed scaled moisture signal from line 194. Comparator 196 receives a scaled but unfiltered moisture signal on its non-inverting input 193 and comparator 197 receives an unfiltered moisture signal which is scaled to a lower level than line 193 on its inverting input 195. A scaled and filtered, or smoothed, moisture signal is presented from line 194 to both comparators 196 and 197. The values of resistors 188–192 are selected such that, with capacitor 210 fully charged, the voltage on line 194 will be between the voltages on lines 193 and 195. If changes in the moisture signal are gradual, then line 194 will respond to the changes sufficiently fast to stay within the "tunnel" between the voltages on lines 193 and 195. If, however, the moisture signal increases or decreases abruptly, line 194 will not have sufficient time to follow and will fall outside of the "tunnel" by either becoming less than the voltage on line 195, for a rapidly increasing moisture signal, or greater than the voltage on line 193, for a rapidly decreasing moisture signal.

When the filtered moisture signal on line 194 is within the "tunnel" between the voltages on lines 193 and 95, the open-collector-transistor output of comparators 196 and 197 are open and capacitor 201 will charge through resistor 200, provided transistor 202 is not conducting. When the moisture signal increases at a sufficiently fast rate to cause the unfiltered voltage on line 195 to increase above the filtered voltage on line 194, line 198 is pulled low by comparator 197 which discharges capacitor 201 through resistor 199. When the moisture signal decreases at a sufficiently fast rate to cause the unfiltered voltage on line 193 to decrease below the filtered voltage on line 194, line 198 is pulled low by comparator 196 which likewise discharges capacitor 201. Therefore, if the moisture signal is changing rapidly, comparators 196 and/or 197 will keep discharging capacitor 201 at a rate that will prevent the voltage on junction 203 from rising sufficiently high to keep the output of comparator 204 conducting, which will clamp line 205 low. This is the manner in which tunnel comparator 78 and logic control 80 function during a normal rain condition with moisture on the windshield periodically being removed by the wipers. When line 205 is clamped low, comparator 206, which defines fast negative signal processing circuit 82 in combination with resistor 207, has an open circuit output and will not influence the value of the processed moisture signal on line 52. In this condition, fast signal processing circuit 82 is nonenabled.

When line 205 is not clamped low by comparator 204, comparator 206 compares the moisture signal on line 42 with the voltage on line 141 which is the same value as the processed moisture signal on output line 52. If the moisture signal on line 42 increases above the voltage on line 141, the output of comparator 206 will be open, which will not affect the voltage across capacitor 135 on line 52. When the moisture signal on line 42 is less than the voltage on line 141, the output of comparator 206 will become conducting and will discharge capacitor 135 through resistor 207 until the voltage on line 52 is reduced to the level of line 42. Therefore, comparator 206, when it is enabled, rapidly offsets the output voltage on line 52 by causing capacitor 135 and resistor 207 to integrate the negative voltage differential between the moisture signal on line 42 and the processed moisture signal on line 52. Resistor 207 has a value of 1.5K ohms to provide a time constant with capacitor 135 on the order of one-quarter of a second.

Comparator 204 defines the logic control circuit 80 and enables the fast negative signal processing circuit 82 by providing an opened circuit on line 205, which allows this line to follow the output of amplifier 141 such that comparator 206 to operate in the previously-described manner. This will occur as long as the voltage on junction 203 is maintained at a level higher than the fixed level on line 124. During non-rain conditions, a positive signal on line 77 will cause transistor 202 to conduct, which will pull junction 203 to a level lower than that on line 124. This will cause comparator 204 to provide a conducting output which will clamp line 205 low, which will prevent fast negative processing circuit 82 from operating.

Assuming the control is in a rain condition, and thus transistor 202 is not conducting, the voltage across capacitor 201 and hence the voltage on junction 203, will be periodically reduced by the conducting output of either or both comparators 196 and 197 in response to the fluctuation of the moisture signal on line 42 as the wipers remove moisture from the windshield in a periodic fashion. This will maintain the output of comparator 204 in a conducting mode which will keep line 205 clamped low and prevent fast negative signal processing circuit 82 from operating. If, however, a dry contaminant film develop on the windshield, while the control is in a rain mode, the moisture signal on line 42 will fluctuate too slowly to keep the voltage across capacitor 201 discharged by comparators 196 and 197. If the voltage across capacitor 201 is increased through resistor 200 to that of line 124, the output of comparator 204 will switch to an open condition which allows line 205 to follow the signal on line 141 which enables fast negative signal processing circuit 82 to operate. With fast negative signal processing circuit 82 enabled, the processed moisture signal on line 52 will rapidly decrease, or be offset downwardly to the level of the moisture signal on line 42. This will cause the reference signal on line 144 to decrease below the moisture signal which will result in output 66 of comparator 60 changing state to indicate to the vehicle wiper control to terminate operation.

The voltage across capacitor 135, which represents the processed moisture signal, is amplified by a unity gain amplifier 140 and scaled through a voltage divider including resistors 142 and 143 connected in series between the output of amplifier 140 and signal ground. The wiper of variable resistor 142 is connected to the non-inverting input 144 of an amplifier configured as a comparator 60. The inverting input of comparator 60 is connected with moisture signal line 42. With this arrangement, if the moisture signal on line 42 has a larger, or more positive, value than input line 144, which would occur when there is little or no moisture on the windshield, output 66 of comparator 60 will be in a low state. As the level of the moisture signal on line 42 decreases in response to moisture on windshield 24, it will become less than input 144 of comparator 60, causing output 66 to switch to a high state.

The circuit illustrated in FIG. 4 represents an individual sensor unit 13 that responds to moisture at one particular location of the windshield 24. The present invention comprehends the provision of multiple such sensor units 13 responding to the moisture at various portions of the windshield. Each unit 13 is interconnected with a master control 15, illustrated in FIG. 5. Master control circuit 15 includes sets of parallel terminals for interconnection with as many of sensor units 13 as are desired. For example, terminal 66a receives a signal from comparator 60 of one sensor unit and terminal 66b receives the output of comparator 60 from another sensor unit 13, and so on. Master control 15 additionally includes one driving signal circuit 70 to produce a drive signal on terminal 72 for indicating to the vehicle wiper control the necessity to operate the wipers. Ignition voltage is provided from the vehicle on terminal 94 and is reverse-polarity protected by diode 97a and surge protected by metal oxide varistor 97b. The processed ignition voltage is distributed from line 93 to all sensor units 13. A voltage regulator 98 supplied by line 93 produces a regulated voltage VCC on line 95, which is likewise distributed to all sensor units 13.

Figure 5:
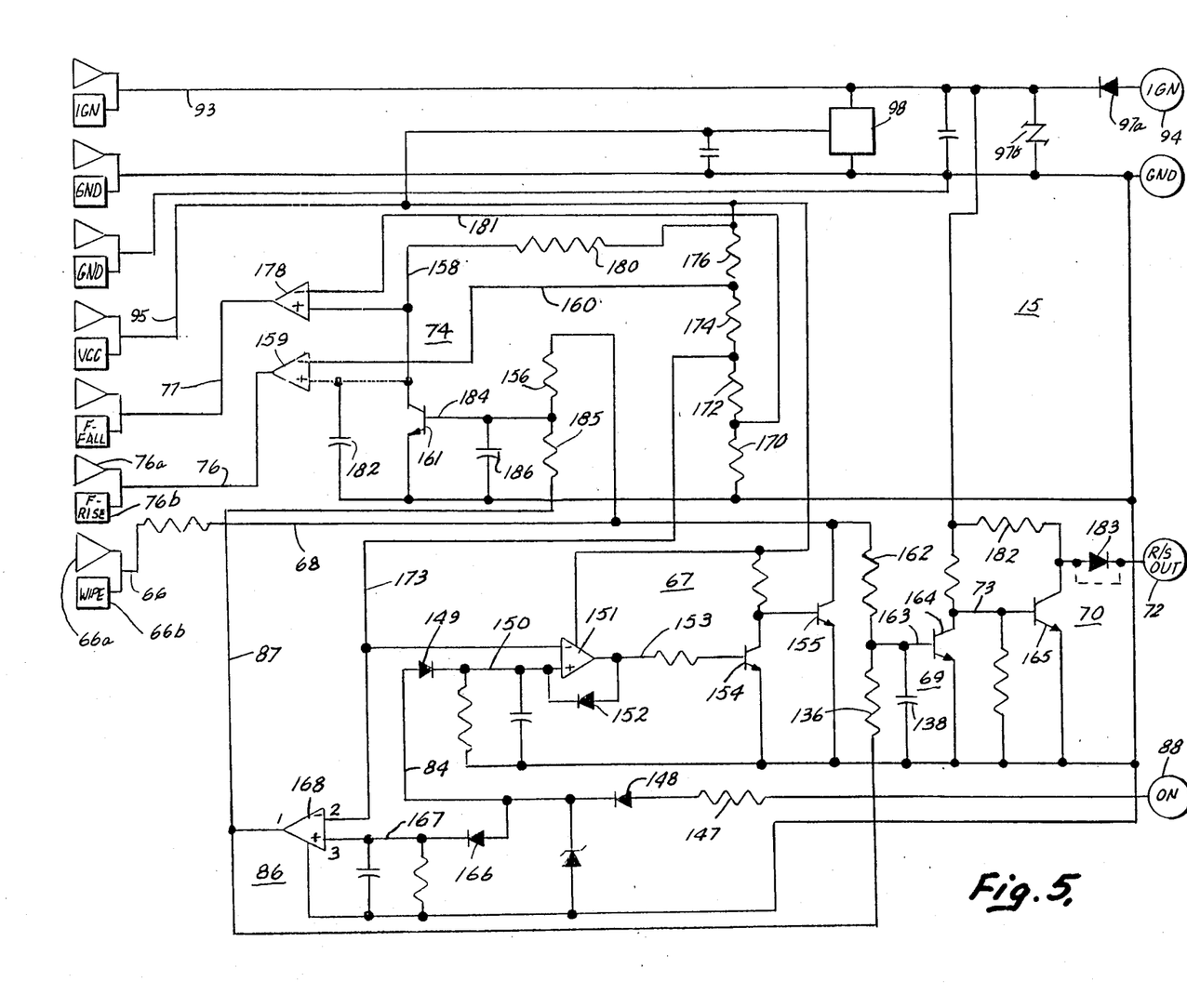
FIG. 5 is the electrical circuit of the master control unit portion of the invention, illustrated in schematic diagram form.

Switch input terminal 88 receives a positive voltage whenever the user presses a momentary switch (not shown) connected to the vehicle's ignition voltage, indicating the selection of the moisture-sensing wiper control function (FIG. 5). Terminal 88 is connected through a resistor 147 and reverse voltage protection diode 148 to line 84. Latch enabling circuit 67 is connected with line 84 through an isolating input diode 149 that is connected to the non-inverting input 150 of an amplifier 151. Amplifier 151 has an output 153 and includes a diode 152 connected in feedback configuration between output 153 and input 150. Output 153 is also connected through a resistor to the base of a transistor 154, the collector of which is connected in series with a biasing resistor to VCC. The base of a transistor 155 is connected with the collector of transistor 154. The collector of transistor 155 is connected with a line 68 which is, in turn, connected with the WIPE outputs 66 of the comparators 60 of all sensor units 13. Lines 66 are connected together to form an OR gate such that one or more outputs 66 reaching a positive state will tend to cause line 68 to assume a positive state.

With this configuration, once input 150 becomes more positive than the amplifier's inverting input 173, which is held at a constant voltage level, output 86 becomes latched in a positive state even after the momentary signal is removed from line 84. The positive level on output 153 causes transistor 154 to conduct. With transistor 154 conducting, the voltage on its collector terminal is at a low level which causes transistor 155 to be non-conducting. With transistor 155 being non-conducting, line 68 is unconstrained and may change states free from influence of transistor 155. In this state, latch enabling circuit 67 is said to be latched "on." However, prior to a positive voltage being applied to terminal 88, the output 153 of amplifier 151 is in a low state, which causes transistor 154 to be non-conducting and transistor 155 to, in turn, be conducting. With transistor 155 being in a conducting state, line 68 is clamped to a low state. When line 68 is clamped in this manner, any positive signals presented on inputs 66 will be precluded from raising line 68 to a positive state and the latch enabling circuit is said to be "off."

Line 68 is connected through a resistor 156 to the base 184 of a transistor 161 whose collector is connected with the non-inverting inputs of amplifier 159 and 178 on a line 158. A parallel combination of a resistor 185 and capacitor 186 are connected between base 184 and signal ground. Amplifier 159 includes an output 76 that is provided as an enabling signal source to the base of transistor 146 (FIG. 4). Amplifier 178 includes an output 77 that is provided as an enabling signal source to the base of transistor 202 (FIG. 4). The inverting input 160 of amplifier 159 and 181 of amplifier 178 are connected to respective fixed reference voltages established by a voltage divider consisting of a series combination of resistors 170, 172, 174 and 176 connected between VCC and signal ground. When WIPE line 66 becomes positive in response to an output from one or more sensor units 13, line 68 switches to a high state, provided latch enabling circuit 67 is latched "on." Line 68 becoming positive, causes transistor 161 to conduct after a delay of approximately 1.5 seconds resulting from capacitor 186 charging. Transistor 161 conducting causes the inputs of amplifiers 159 and 178 connected with line 158 to become lower in amplitude than fixed inputs 160 and 181, respectively, which causes outputs 76 and 77 to switch to a low state. With outputs 76 and 77 at a low state, the enabling transistors 146 and 202 of all sensor units 13 are switched to a non-conducting state, which enables the fast positive signal processing circuits 48 for all units 13 to operate and enables the negative signal processing circuits 82 to operate whenever the moisture signal ceases to fluctuate.

When line 66 is at a low state in response to no sensor unit 13 providing a WIPE output signal from its comparator 60, line 68 will be low and transistor 161 non-conducting. In this state, input 158 is raised to a more positive voltage than inputs 160 and 181 by a pull-up resistor 180 connected to VCC. This causes outputs 76 and 77 to switch to a high state which causes all enabling transistors 146 and 202 to become conducting. This, in turn, disables the fast positive signal processing circuits 48 and fast negative signal processing circuits 82 for all sensor units 13. Because input 181 is established at a lower level than input 160, the output of amplifier 178 will switch positive sooner than the output of amplifier 159 in response to the exponentially rising voltage on line 158. This will cause the fast negative signal process circuits, if enabled, to be disabled after approximately 0.1 seconds to assure that the preference signal is processed to a sufficiently low level below the moisture signal to avoid an 15 indeterminate condition. The fast positive signal process circuits will be disabled after approximately 7 seconds to allow time for the windshield to completely dry.

Line 68 is additionally connected through a resistor 162 to the base 163 of a transistor 164 and to a parallel combination of a resistor 136 and a capacitor 138, whose opposite terminals connect with signal ground. The collector of transistor 164 is connected by a line 73 to ignition voltage through a resistor and to the base of another transistor 165, which defines output signal drive circuit 70. The collector of transistor 165 is connected to ignition voltage through a resistor 182 and to terminal 72 through a forward-poled diode 183. When line 68 goes high, in response to a WIPE signal from any unit 13, and provided latch enabling circuit 67 is latched on, transistor 164 becomes conducting after a delay of approximately 24 milliseconds. The delay is a result of capacitor 138, which defines filter 69, charging to a level sufficient to drive transistor 164. When transistor 164 conducts, transistor 165 becomes non-conducting, and terminal 72 is pulled to a positive level by resistor 182 to provide a drive signal to the vehicle's normal speed wiping control.

Input line 84 is additionally connected to initial wipe generation circuit 86, which includes an isolating diode 166 extending from line 84 to the non-inverting input 167 of an amplifier 168 whose inverting input is connected to a fixed voltage level on line 173. Output 87 of amplifier 168 is connected through a resistor 136 to base 163 of transistor 164. When a momentary voltage is applied to input terminal 88, the positive voltage provided to input 167 of amplifier 168 causes output 87 to become positive, which causes transistors 164 to conduct which, in turn, causes transistor 165 to become non-conducting to provide a momentary positive level on terminal 72 of sufficient duration to produce one wipe of the windshield with the vehicle wiper.

Output 76 of amplifier 159 is momentarily caused to assume a low state upon initial power-up of the master control circuit by the application of ignition voltage to terminal 94 in order to momentarily enable all fast positive signal processing circuits 48, regardless of the moisture condition of the windshield, to cause the processed moisture signal lines 52 of the processed moisture signal circuits 44 on all units 13 to rapidly adapt to the value of the respective moisture signals. This is accomplished by a capacitor 182 which pulls input 158 of amplifier 159 below input 160 for approximately the 7 seconds that it takes to charge capacitor 182 through resistor 180. Output 76 of amplifier 159 is additionally momentarily caused to assume a low state upon user-selection of the moisture-sensor control mode. This is accomplished by the connection between output 87 of amplifier 186 through resistor 185 to base 184 of transistor 161. When output 87 switches to a positive state in response to a user selecting the moisture-sensing wiper control function, transistor 161 becomes conducting, which discharges capacitor 182 and momentarily lowers the non-inverting input 158 of amplifier 159 below inverting input 160. These same factors which cause a momentary enabling of the fast positive signal processing circuits additionally causes the output of amplifier 178 to change states. However, the fast negative processing circuits 82 do not become enabled because of the discharge condition of capacitor 201.

Although the invention has been illustrated with the use of an optical moisture sensor, it is not limited to this application and may be utilized with other moisture detecting devices. In addition, the invention may be applied to other vehicle windows swept by a wiper such as a rear light. Although the invention is illustrated in a moisture sensing wiper control embodiment that produces a digital output to either actuate or deactivate a vehicle wiper control, it may be also be embodied in a moisture sensing wiper control that outputs an analog voltage to modulate the wiper speed of a vehicle wiper control. Furthermore, although the invention is illustrated in an analog-circuit embodiment, it is capable of embodiment in a digital circuit control, such as a microprocessor-based control. Other changes and modifications in the specifically described embodiments can be carried out without departing from the principles of the invention which is intended to be limited only by the scope of the appended claims, as interpreted according to the principles of patent law, including the doctrine of equivalents.

The embodiments of the invention in which an exclusive property or privilege is claimed are defined as follows.

1. A wiper control for use with the window of a vehicle having a window and wiper means operative to remove moisture from a portion of said window, said wiper control comprising:
   moisture sensing means responsive to the presence of moisture for producing a moisture signal representative of the amount of moisture present;
   reference signal generating means for generating a reference signal;
   comparison means responsive to said moisture signal and said reference signal for producing an output to the vehicle wiper means indicative of the relationship between said moisture signal and said reference signal; and
   wherein the improvement comprises said reference signal generating means being responsive to said moisture signal and including signal processing means for substantially continuously adapting said reference signal to said moisture signal at a faster rate during periods of decreasing sensed moisture than during periods of increasing sensed moisture.

2. The wiper control in claim 1 further including inhibiting means responsive to said output for inhibiting said signal processing means from adapting said reference signal to said moisture signal at said faster rate during periods of substantially no sensed moisture.

3. The wiper control in claim 1 in which said reference signal generating means further includes second signal processing means responsive to said moisture signal for offsetting said reference signal and means for enabling said second signal processing means in response to said moisture signal not exceeding a predetermined level of fluctuation within a predetermined period of time.

4. The wiper control in claim 3 further including disabling means responsive at least to said output for disabling said signal processing means from adapting said reference signal to said moisture signal at said faster rate and said second signal processing means from offsetting said reference signal during periods of substantially no sensed moisture.

5. A wiper control for use with the window of a vehicle having a window and wiper means operative to remove moisture from a portion of said window, said wiper control comprising:
   moisture sensing means responsive to the presence of moisture for producing a moisture signal representative of the amount of moisture present;
   reference signal generating means for generating a reference signal;
   comparison means responsive to said moisture signal and said reference signal for producing an output to the vehicle wiper means indicative of the relationship between said moisture signal and said reference signal; and
   wherein the improvement comprises said reference signal generating means being responsive to said moisture signal for substantially continuously adapting said reference signal to said moisture signal and including first signal processing means for adapting said reference signal toward said moisture signal at a first predetermined rate and second signal processing means for adapting said reference signal toward said moisture signal at a second predetermined rate that is faster than said first predetermined rate, said second signal processing means responsive only to a relationship of said moisture signal to said reference signal indicative of decreasing sensed moisture.

6. The wiper in claim 5 further including disabling means responsive to said output for disabling said second signal processing means during periods that said output provides a predetermined relationship indicative of substantially no sensed moisture.

7. The wiper control in claim 5 in which said reference signal generating means further includes third signal processing means for offsetting said reference signal toward said moisture signal at a third predetermined rate that is faster than said first predetermined rate and enabling means for enabling said third signal processing means in response to said moisture signal not exceeding a predetermined level of fluctuation within a predetermined period of time.

8. The wiper control in claim 7 further including disabling means responsive to said output for disabling said second and third signal processing means during periods of substantially no sensed moisture.

9. A wiper control for use with the window of a vehicle having a window and wiper means operative to remove moisture from a portion of said window, said wiper control comprising:
moisture sensing means responsive to the presence of moisture for producing a moisture signal representative of the amount of moisture present;
reference signal generating means for generating a reference signal;
comparison means responsive to said moisture signal and said reference signal for producing an output to the vehicle wiper means indicative of the relationship between said moisture signal and said reference signal;
mode means responsive to said output indicating a predetermined relationship between said moisture signal and said reference signal for producing an indication of the presence of moisture; and
said reference signal generating means being responsive to said moisture signal generating means being responsive to said moisture signal and said mode means and including means for determining that said moisture signal is stable and said mode means is producing an indication of the presence of moisture and for offsetting the reference signal in response to a stable moisture signal and an indication of the presence of moisture in order to cause said mode means to change said predetermined relationship between said moisture signal and said reference signal.

10. The wiper control in claim 9 in which said determining means includes means for monitoring the magnitude of said moisture signal and for determining that said magnitude remains within predetermined levels within a predetermined time period.

11. A wiper control for use with the window of a vehicle having a window and wiper means operative to remove moisture from a portion of said window, said wiper control comprising:
moisture sensing means responsive to the presence of moisture for producing a moisture signal representative of the amount present;
reference generating means responsive to said moisture signal for generating a reference signal;
comparison means responsive to said moisture signal and said reference signal for producing an output signal adapted to operate the vehicle wiper means when said moisture signal has a predetermined relationship to said reference signal; and
said reference generating means including moisture signal processing means for continually processing said moisture signal in a manner to maintain a predetermined relationship between said moisture signal and a processed moisutre signal, including first means for integrating differentials between said moisture signal and said processed moisture signal of one polarity and second means for integrating said differentials of both said one polarity and another polarity opposite to said one polarity, wherein said first means causes said reference generating means to integrate said differentials at a different rate than the rate at which said second means integrates said differentials and wherein said reference signal is a function of the value of said processed moisture signal.

12. The wiper control in claim 11 in which said moisture sensing means includes means for incrementally increasing said moisture signal in the direction of said opposite polarity in response to increases in the amount of moisture present and in which said first means integrates said differentials at a faster rate than said second means.

13. The wiper control in claim 11 further including enabling means responsive to said comparison means for enabling said first means when said moisture signal has said predetermined relationship to said reference signal.

14. The wiper control system in claim 11 further including disabling means responsive to said comparison means and to a source of power for said wiper control for disabling said first means except when said moisture signal has said predetermined relationship to said reference signal and for a predetermined period of time after power is applied from said source to said wiper control.

15. The wiper control system in claim 11 further including a source of power for said wiper control and a user-operable control switch means for clamping said output signal except when a user operates said control switch means and disabling means responsive to said comparison means, said source of power and said control switch means for disabling said first means except when said moisture signal has said predetermined relationship to said reference signal and for a predetermined period of time after power is applied from said source to said wiper control or when the user operates said control switch means.

16. The wiper control in claim 13 further including a plurality of said moisture sensing means, a plurality of said comparison means and a plurality of reference generating means including a plurality of said first means; said enabling means being responsive to said plurality of said comparison means for enabling said plurality of said first means when any one of said comparison means indicates that its associated moisture signal has said predetermined relationship to its associated reference signal.

17. The wiper control in claim 12 in which said moisture signal processing means further includes third means for causing said reference generating means to offset said moisture signal, and said control further includes determining means for determining that said moisture signal is stable and for enabling said third means in response to a stable moisture signal.

18. The wiper control in claim 17 in which said determining means includes monitoring means for monitoring the magnitude of said moisture signal and for determining that said magnitude does not exceed a predetermined level within a predetermined time period.

19. The wiper control in claim 17 further including disabling means responsive to said comparison means for disabling said first and third means except when said moisture signal has said predetermined relationship to said reference signal.

20. The wiper control in claim 19 further including a plurality of said moisture sensing means, a plurality of said comparison means and a plurality of said reference generating means including a plurality of said first and third means and in which said disabling means is responsive to said plurality of said comparison means for disabling said plurality of said first and third means except when any one of said comparison means indicates that its associated moisture signal has said predetermined relationship to its associated reference signal.

21. A wiper control for use with a vehicle having a window and wiper means operative to remove moisture from a portion of said window, said wiper control comprising:
    moisture sensing means responsive to the presence of moisture on the vehicle window for producing a moisture signal representative of the amount of moisture present on said window;
    reference generating means responsive to said moisture signal for generating a reference signal;
    comparison means responsive to said moisture signal and said reference signal for producing an output signal adapted to operate the vehicle wiper means when said moisture signal has a predetermined relationship to said reference signal;
    said reference generating means including a capacitor, said reference signal being proportional to the voltage across said capacitor;
    a bidirectional conductance path between said moisture sensing means and said capacitor including a first predetermined series impedance;
    a unidirectional conductance path between said moisture sensing means and said capacitor including a second predetermined series impedance and a series unidirectional switch; and
    said second impedance has a value lower than said first impedance and said unidirectional switch oriented to conduct changes in said moisture signal representing a decrease in the amount of moisture on said windshield, such that said reference signal will respond more rapidly to decreases in the amount of moisture on said windshield than to increases in the amount of moisture on said windshield.

22. The wiper control in claim 21 further including disabling means responsive to said comparison means for disabling said unidirectional conductance path except when said moisture signal has said predetermined relationship to said reference signal indicative of a rain condition.

23. The wiper control in claim 21 in which said moisture sensing means includes a signal emitter emitting an intermittent signal, a receiver producing a receiver signal in response to said intermittent signal and signal processing means responsive to said signal emitter and said receiver for processing said receiver signal into a moisture signal, said signal processing means including a second capacitor connected with an output of said receiver and discharging means for discharging said second capacitor, said discharging means responsive to said signal emitter to discharge said second capacitor when said signal emitter is emitting a signal in order to lower the signal on said capacitor if said output of said receiver decreases.

24. The wiper control in claim 23 further including blocking means responsive to said signal emitter for blocking said signal processing means from processing said receiver signal to said second capacitor between periods of said signal emitter emitting a signal.

25. The wiper control in claim 21 further including a discharge path for said capacitor including a third impedance has a value lower than said first impedance and switch means for selectively connecting said discharge path with said capacitor such that said reference signal will adapt more rapidly to a moisture signal greater than said reference signal when said discharge path is connected with said capacitor than when not connected.

26. A wiper control system for use with a vehicle having a window and wiper means operative to remove moisture from a portion of said window, said wiper control system comprising:
    a plurality of moisture sensing units, each of said moisture sensing units including moisture sensing means responsive to the presence of moisture on the vehicle window for producing a moisture signal representative of the amount of moisture present at said sensing unit, reference generating means responsive to said moisture signal for generating a reference signal and comparison means responsive to said moisture signal and said reference signal for producing an output to the vehicle wipe control system indicative of the relationship between said moisture signal and said reference signal; and
    a master control interconnected with said plurality of moisture sensing units and including modifying means actuatable for modifying the manner in which said reference generating means on said plurality of moisture sensing units respond to their respective moisture signals, said modifying means being actuated in response to any one of said moisture sensing units producing an output indicative of a predetermined relationship between its moisture and reference signals that indicates the presence of moisture.

27. The wiper control system in claim 26 in which said master control further includes drive means actuatable for producing a signal adapted to cause the vehicle wiper means to wipe the windshield in response to any one of said moisture sensing units producing an output signal indicative of a predetermined relationship between its moisture and reference signal that indicates the presence of moisture.

28. A wiper control system for use with a vehicle having a window and wiper control system for use with a vehicle having a window and wiper means operative to remove moisture from a portion of said window, said wiper control system comprising:
    a plurality of moisture sensing units, each of said moisture sensing units including moisture sensing means responsive to the presence of moisture on the vehicle window for producing a moisture signal representative of the amount of moisture present at said sensing unit, reference generating means responsive to said moisture signal for generating a reference signal and comparison means responsive to said moisture signal and said reference signal for producing an output to the vehicle wipe control system indicative of the relationship between said moisture signal and said reference signal;

a master control interconnected with said plurality of moisture sensing units and including modifying means actuatable for modifying the manner in which said reference generating means on said plurality of moisture sensing units respond to their respective moisture signals, said modifying means being actuated in response to any one of said moisture sensing units producing an output indicative of a predetermined relationship between its moisture and reference signals that indicates the presence of moisture; and wherein said reference generating means when not modified by said modifying means responds at a first predetermined rate to incremental changes in said moisture signal of both first and second opposite polarities, said first polarity being indicative of a decrease in the presence of moisture and said second polarity being indicative of an increase in the presence of moisture, and in which said reference generating means when modified by said modifying means responds to incremental changes in said moisture signal of said first polarity at a second predetermined rate which is substantially faster than said first predetermined rate, and to incremental changes in said moisture signal of said second polarity at said first predetermined rate.

29. The wiper control system in claim 28 in which said moisture sensing means includes infrared radiation generating means and infrared receiving means responsive to said radiation generating means in a manner that said first polarity is an incrementally decreasing amplitude of said moisture signal.

30. The wiper control system in claim 28 in which said reference generating means further includes determining means for determining that said moisture signal is stable and for offsetting the reference signal in response to a stable moisture signal when said reference generating means is not modified by said modifying means.

* * * * *

UNITED STATES PATENT AND TRADEMARK OFFICE
CERTIFICATE OF CORRECTION

PATENT NO. : 4,916,374

DATED : April 10, 1990

INVENTOR(S) : Kenneth L. Schierbeek, Mark L. Larson, and Kenneth Schofield

It is certified that error appears in the above-identified patent and that said Letters Patent is hereby corrected as shown below:

Column 10, line 50;
      After "line" insert --42--.

Column 11, line 31;
      "95" should be --195--.

Column 14, line 48;
      Before "indeterminate" delete --15--.

Column 17, claim 9, lines 42 and 43;
      After "signal" delete --generating means...signal--.

Column 17, claim 11, line 64;
      After "amount" insert --of moisture--.

Column 18, claim 11, line 8;
      "moisutre" should be --moisture--.

Column 20, claim 27, line 48;
      "drive" should be --driving--.

Column 20, claim 28, line 56 and 57;
      After "wiper" delete --control system...and wiper--.

Signed and Sealed this

First Day of October, 1991

*Attest:*

HARRY F. MANBECK, JR.

*Attesting Officer*      *Commissioner of Patents and Trademarks*